United States Patent [19]

Imura

[11] Patent Number: 5,222,771
[45] Date of Patent: Jun. 29, 1993

[54] BRAZED PIPE ASSEMBLY AND METHOD
[75] Inventor: Izumi Imura, Shizuoka, Japan
[73] Assignee: Usui Kokusai Sangyo Kaisha Ltd., Japan
[21] Appl. No.: 783,423
[22] Filed: Oct. 28, 1991
[30] Foreign Application Priority Data
  Nov. 6, 1990 [JP] Japan .................. 2-300159
[51] Int. Cl.⁵ .................................. F16L 13/02
[52] U.S. Cl. ............................ 285/286; 285/62;
  285/189; 285/197; 29/890.148; 29/890.043
[58] Field of Search ............. 285/61, 62, 172, 286,
  285/287, 212, 158, 189, 197; 29/890.148,
  890.043; 123/456, 468, 469, 470; 228/208

[56] References Cited

U.S. PATENT DOCUMENTS

| | | | |
|---|---|---|---|
| 3,142,358 | 7/1964 | Woerheide, Jr. | 285/212 |
| 3,315,988 | 4/1967 | Schroter | 285/212 |
| 3,929,109 | 12/1975 | Chamberlain | 123/468 |
| 4,223,826 | 9/1980 | Usui | 228/208 |
| 4,519,368 | 5/1985 | Hudson, Jr. | 123/468 |
| 4,865,361 | 9/1989 | Koukal et al. | 285/189 |
| 5,022,372 | 6/1991 | Imura et al. | 123/469 |
| 5,072,710 | 12/1991 | Washizu | 285/189 |
| 5,116,084 | 5/1992 | Usui et al. | 285/286 |

FOREIGN PATENT DOCUMENTS 900045 1/1982 U.S.S.R. ..................... 123/468

Primary Examiner—Eric K. Nicholson
Attorney, Agent, or Firm—Anthony J. Casella; Gerald E. Hespos

[57] ABSTRACT

A fluid pipe assembly comprises a block, and a discrete eye joint. The block has a rear wall defining a mounting surface adapted to be mounted to a base, and a side wall defining a recess. The block includes mounting holes extending therethrough, and a passage extending from the recess and terminating at the mounting surface. The eye joint includes a generally spherical wall defining an axial hole, and a short cylindrical wall extending from the generally spherical wall and communicated with the axial hole. The short cylindrical wall of the eye joint is brazed to the recess of the block to form a joint. A pipe includes a cylindrical wall in which an opening is formed. The pipe extendes through the axial hole of the eye joint so that the opening may be aligned with the short cylindrical wall. The pipe is brazed to the peripheral edges of the axial hole of the eye joint.

10 Claims, 2 Drawing Sheets

BRAZED PIPE ASSEMBLY AND METHOD

BACKGROUND OF THE INVENTION

1. Field of the Invention

The present invention relates to a fluid pipe having a relatively small diameter of less than 20 mm and mounted in a vehicle, ships and other machines or apparatus to supply lubricant or air, and a method for producing the same.

2. Description of the Prior Art

FIG. 5 illustrates a conventional pipe assembly for feeding lubricant and its production method. As shown, a joint 11 includes a rectangular block 12 formed by forging process. The block 12 has a rear wall in its width direction to define a mounting surface 13 attached to a base. A through hole 15 extends between side walls of the block 12. A bore 15' extends perpendicular to and communicated with the through hole 15. The bore 15' terminates at the mounting surface 13 of the block 12. A pipe P' has one end fit into the through hole 15 of the joint and the other end closed by a rod-like plug. When a plurality of joints 11 are arranged one after another, discrete pipes P' are fit into opposite ends of the through hole 15 of each joint. A tapered threaded plug 16 is threaded into the outer end of the bore 15'. At least one one of the pipes P' and/or the rod-like plug are brazed to the through hole 15.

However, since the joint 11 is formed by forging process, and the through hole 15 extends between opposite side walls, the joint is rather large and heavy. The use of the threaded plug 16 and the threaded bore 15' requires cumbersome cutting operation. The joint 11 is thick as it is formed by forging, and the pipe P' and the rod-like plug are thin. As such, when these components are brazed to the through hole 10, the thick joint 11 is heated less than it should be, whereas the thin pipe P' is heated more than it should be. This is due to the difference in thickness or mass (heat capacity). Fitting of a plurality of pipes P' into opposite ends of each through hole is cumbersome and ineffective. This may cause leakage at a region where brazing is effected. Also, this presents a problem that the pitch between adjacent joints is inaccurate.

SUMMARY OF THE INVENTION

In view of the problems encountered in the prior art, it is an object of the present invention to provide a fluid pipe assembly and its production method, which is relatively small and lightweight, which eliminates the need for a threaded plug and a threaded bore so as to simplify cutting operation, which provides a pipe substantially identical in diameter to a joint to assure brazing of the pipe to an axial hole of the joint, and which includes and elongated unitary pipe brazed to the peripheral edge of the axial hole of each of a plurality of joints arranged one after another so as to prevent leakage.

In order to achieve the foregoing objects, the present invention provides a fluid pipe assembly which comprises a block having a rear wall in a width direction defining a mounting surface adapted to be mounted to a base, and a side wall defining a recess, the block including mounting holes extending therethrough, and a passage extending from the recess and terminating at the mounting surface, a discrete eye joint including a generally spherical wall defining an axial hole, and a short cylindrical wall extending from the generally spherical wall and communicated with the axial hole, the short cylindrical wall of the eye joint being brazed to the recess of the block to form a single joint, and a pipe including a cylindrical wall in which an opening is formed, the pipe extending through the axial hole of the eye joint so that the opening may be aligned with the short cylindrical wall and being brazed to the peripheral edge of the axial hole. There is also provided a fluid pipe assembly comprising blocks each having a rear wall in a width direction defining a mounting surface adapted to be mounted to a base, and a side wall defining a recess, each of the blocks including mounting holes extending therethrough, and a passage extending from the recess and terminating at the mounting surface, discrete eye joints each including a generally spherical wall defining an axial hole, and a short cylindrical wall extending from the generally spherical wall and communicated with the axial hole, the generally spherical walls of the eye joints being brazed to the recesses of the blocks to provide a plurality of joints, and an elongated unitary pipe including a cylindrical wall in which a plurality of openings are formed in a spaced relation, the pipe extending through the axial holes of the eye joints so that the openings may be aligned with the short cylindrical walls of the eye joints and being brazed to the peripheral edges of the axial holes of the joints.

Further, there is provided a method of producing a fluid pipe assembly including a block having a rear wall in a width direction defining a mounting surface adapted to be mounted to a base, and a side wall defining a recess, the block including mounting holes extending therethrough, and a passage extending from the recess and terminating at the mounting surface, a discrete eye joint including a generally spherical wall defining an axial hole, and a short cylindrical wall extending from the generally spherical wall and communicated with the axial hole, and a pipe including a cylindrical wall in which an opening is formed, the method comprising the steps of fitting the short cylindrical wall of the eye joint to the recess of the block to provide a joint, inserting the pipe into the axial hole of the eye joint so that the opening may be aligned with the short cylindrical wall of the eye joint, brazing the short cylindrical wall of the eye joint to the recess of the block, and brazing the pipe to the peripheral edge of the axial hole of the eye joint. There is also provided a method of producing a fluid pipe assembly including blocks each having a rear wall in a width direction defining a mounting surface adapted to be mounted to a base, and a side wall defining a recess, each of the blocks including mounting holes extending therethrough, and a passage extending from the recess and terminating at the mounting surface, discrete eye joints each including a generally spherical wall defining an axial hole, and a short cylindrical wall extending from the generally spherical wall and communicated with the axial hole, and a pipe including a cylindrical wall in which a plurality of openings are formed in a spaced relation, the method comprising the steps of fitting the generally spherical walls of the eye joints to the recesses of the blocks to provide a plurality of joints, inserting the pipe into the axial holes of the eye joints so that the openings may be aligned with the short cylindrical walls of the eye joints, brazing the short cylindrical walls of the eye joints to the recesses of the blocks, and brazing the pipe to the peripheral edges of the axial holes of the eye joints. The pipe has one end closed by a plug.

The block is made by cutting a molded steel to a fixed length and then, machine finished. The eye joint is thin and is a standard piping component made on a mass production basis. These block and eye joint are assembled together to provide a joint. The joint as a product is thus compact and lightweight. Additionally, the eye joint is fit directly into the recess of the block. This eliminates the need for a threaded plug and a threaded bore used int he prior art and simplifies cutting operation as such. The pipe can easily and safely be brazed to the axial hole of the joint composed of the molded steel and the thin eye joint. The elongated unitary pipe is brazed to the axial hole of each of a plurality of joints to prevent leakage.

DETAILED DESCRIPTION OF PREFERRED EMBODIMENTS

Figure 1:
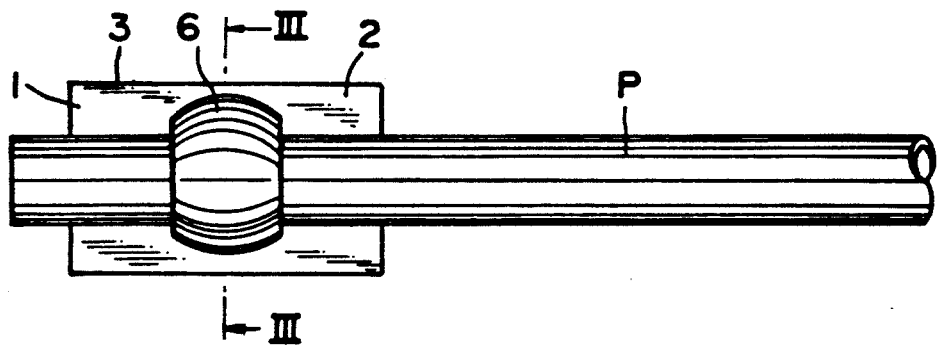
FIG. 1 is a top view of a fluid pipe made according to one embodiment of the present invention.
Figure 2:
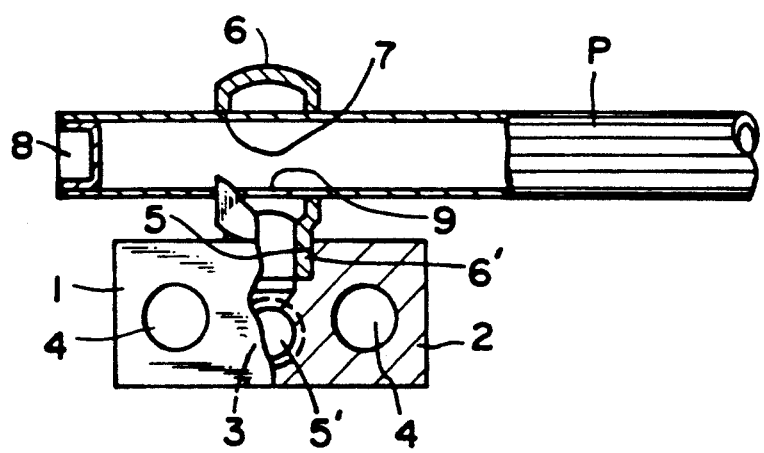
FIG. 2 is a plan view, partly broken away, of the fluid pipe shown in FIG. 1.
Figure 3:
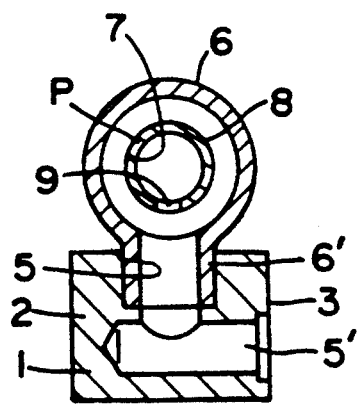
FIG. 3 is a sectional view taken along the line III-—III of FIG. 1.
Figure 4:
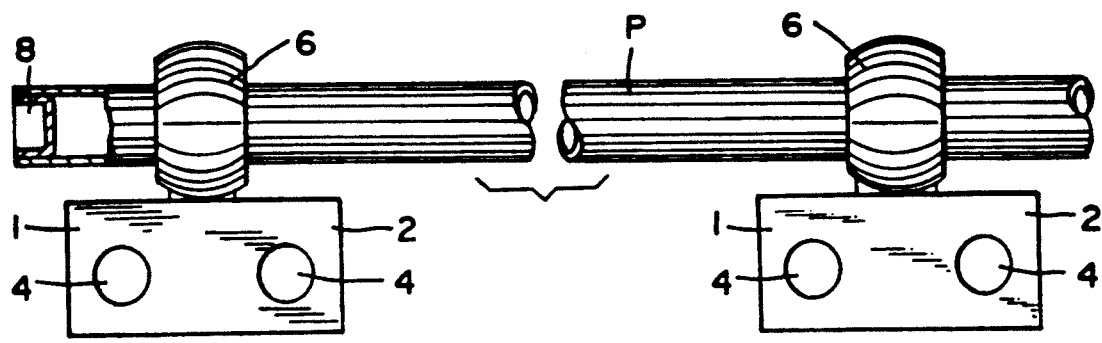
FIG. 4 is a plan view, partly broken away, showing another embodiment of the present invention.
Figure 5:
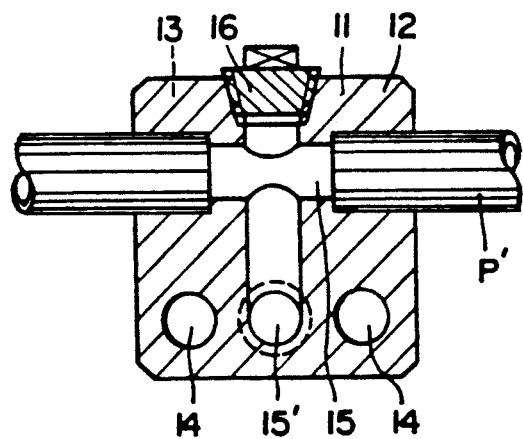
FIG. 5 is a plan view, partly broken away, of a conventional joint.

Referring to FIGS. 1 to 4, 1 is a joint including a block 2, and a discrete eye joint 6. The block 2 has a rear wall in its width direction defining mounting surface 3 mounted to a base (not shown). A plurality of mounting holes 4 extend through the block 2. A recess 5 is formed in the side wall of the block 2. A L-shaped bore 5' extends from the recess 5 and terminates at the mounting surface 3 of the block 2. A molded piece of steel is cut to a fixed length and machine finished to provide a block 2. The eye joint 6 includes a generally spherical wall in which an axial hole 7 is formed, and a short cylindrical wall 6' extends from the generally spherical wall and communicated with the axial hole 7. The short cylindrical wall 6' of the eye joint 6 is received in the recess 5. A pipe P includes one or more openings 9 spaced a distance from one another, as shown in FIG. 5, and has one end closed by a plate-like plug 8. The pipe P extends through the axial hole 7 of the eye joint 6 so that the opening 9 may be aligned with the cylindrical wall 6'. The pipe P may extends through a plurality of joints 1. Under the circumstances, the short cylindrical wall 6', the plug 8 and the the pipe P are brazed to the recess 5, the end of the pipe P and the through hole 7, respectively.

As an alternative, the block 2 and the eye joint 6 may be brazed together, and then, the pipe P is assembled and then, brazed thereto. Also, the pipe P may be inserted into and brazed to the eye joint 6. Thereafter, the block 2 and the eye joint 6 may be brazed together.

As discussed above, in the fluid pipe assembly and its production method according to the present invention, the block 2 and the eye joint 6 are assembled together to provide a joint 1. The joint is thus relatively small and lightweight. Additionally, the present invention eliminates the need for a threaded plug and a threaded bore used in the prior art so as to simplify cutting operation. The block 2 is molded of steel, and the thin eye joint 6 is a standard piping component made on a mass production basis. A plurality of joints can thus be arranged with accurate pitch. The elongated unitary pipe P is brazed to the axial hole 7 to prevent leakage. The fluid pipe assembly and its production method are highly useful.

I claim:

1. A fluid pipe assembly comprising:
   a block having a rear wall in a width direction defining a mounting surface adapted to be mounted to a base, and a side wall defining a recess, said block including mounting holes extending therethrough, and a passage extending from said recess and terminating at said mounting surface;
   a discrete eye joint including a generally spherical cylindrical wall defining an axial hole, and a short cylindrical wall extending from said generally spherical wall and communicated with said axial hole; and
   said short cylindrical wall of the eye joint being brazed to said recess of said block to form a single joint,
   a pipe including a cylindrical wall in which an opening is formed, said pipe extending through said axial hole of the eye joint so that said opening may be aligned with said short cylindrical wall, said pipe being brazed to the peripheral edge of said axial hole.

2. The assembly of claim 1, wherein said pipe has one end closed by a plug.

3. The assembly of claim 1, wherein said block is made by cutting a molded steel to a fixed length and machine finishing the cut steel.

4. A fluid pipe assembly comprising:
   blocks each having a rear wall in a width direction defining a mounting surface adapted to be mounted to a base, and a side wall defining a recess, each of said blocks including mounting holes extending therethrough, and a passage extending from said recess and terminating at said mounting surface;
   discrete eye joints each including a generally spherical wall defining an axial hole, and a short cylindrical wall extending from said generally spherical wall and communicated with said axial hole; and
   said short cylindrical walls of the eye joints being brazed to said recesses of said blocks to provide a plurality of joints,
   an elongated unitary pipe including a cylindrical wall in which a plurality of openings are formed in a spaced relation, said pipe extending through said axial holes of said eye joints so that said openings may be aligned with said short cylindrical walls of the eye joints, said pipe being brazed to the peripheral edges of the axial holes of said plurality of joints.

5. The assembly of claim 4, wherein said pipe has one end closed by a plug.

6. The assembly of claim 4, wherein said block is made by cutting a molded steel to a fixed length and machine finishing the cut steel.

7. A method of producing a fluid pipe assembly including a block having a rear wall in a width direction defining a mounting surface adapted to be mounted to a base, and a side wall defining a recess, said blocks including mounting holes extending therethrough, and a passage extending from said recess and terminating at said mounting surface, a discrete eye joint including a generally spherical wall defining an axial hole, and a short cylindrical wall extending from said generally spherical wall and communicated with said axial hole, and a pipe including a cylindrical wall in which an opening is formed, said method comprising the steps of:

fitting said short cylindrical wall of the eye joint to said recess of said block to provide a joint;

inserting said pipe into said axial hole of said eye joint so that said opening may be aligned with said short cylindrical wall of said eye joint;

brazing said short cylindrical wall of said eye joint to said recess of said block; and brazing said pipe to the peripheral edge of said axial hole of said eye joint.

8. The method of claim 7, further including the step of fitting a plug into one end of said pipe and brazing said plug thereto.

9. A method of producing a fluid pipe assembly including blocks each having a rear wall in a width direction defining a mounting surface adapted to be mounted to a base, and a side wall defining a recess, each block including mounting holes extending therethrough, and a passage extending from said recess and terminating at said mounting surface, discrete eye joints each including a generally spherical wall defining an axial hole, and a short cylindrical wall extending from said generally spherical wall and communicated with said axial hole, and a pipe including a cylindrical wall in which a plurality openings are formed in a spaced relation, said method comprising the steps of:

fitting said short cylindrical walls of the eye joints to said recesses of said blocks to provide a plurality of joints;

inserting said pipe into said axial holes of said eye joints so that said openings may be aligned with said short cylindrical walls of said eye joints;

brazing said short cylindrical walls of said eye joints to said recesses of said blocks; and brazing said pipe to the peripheral edges of said axial holes of said eye joints.

10. The method of claim 9, further including the step of fitting a plug into one end of said pipe and brazing said plug thereto.

* * * * *